(12) United States Patent
Kobayashi et al.

(10) Patent No.: US 7,108,799 B2
(45) Date of Patent: *Sep. 19, 2006

(54) ELECTROMAGNETIC WAVE ABSORBER FORMED OF MN-ZN FERRITE

(75) Inventors: Osamu Kobayashi, Iwata-gun (JP); Kiyoshi Ito, Iwata-gun (JP); Masashi Norizuki, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 66 days.

This patent is subject to a terminal disclaimer.

(21) Appl. No.: 10/766,923

(22) Filed: Jan. 30, 2004

(65) Prior Publication Data

US 2004/0185289 A1 Sep. 23, 2004

(30) Foreign Application Priority Data

Feb. 14, 2003 (JP) .............................. 2003-037123

(51) Int. Cl.
*H01F 1/14* (2006.01)

(52) U.S. Cl. .............................. 252/62.62; 252/62.63; 252/62.51 R; 342/1; 428/611; 428/649

(58) Field of Classification Search ............. 252/62.62, 252/62.63, 62.51 R; 342/1; 428/611, 649
See application file for complete search history.

(56) References Cited

U.S. PATENT DOCUMENTS

2002/0008336 A1 1/2002 Otobe et al.

FOREIGN PATENT DOCUMENTS

| DE | 1 177 538 | | 9/1964 |
|---|---|---|---|
| DE | 1177538 | * | 9/1964 |
| EP | 0 980 856 A1 | | 2/2000 |
| EP | 1 136 460 A1 | | 9/2001 |
| JP | 07-230909 | | 8/1995 |
| JP | 09-180925 | | 7/1997 |
| JP | A-2000-133510 | | 5/2000 |
| JP | 3108803 | | 9/2000 |
| JP | A-2000-351625 | | 12/2000 |
| JP | A-2001-093719 | | 4/2001 |
| JP | A-2002-289413 | | 10/2002 |
| JP | 2002-338339 | * | 11/2002 |

* cited by examiner

*Primary Examiner*—C. Melissa Koslow
(74) *Attorney, Agent, or Firm*—Oliff & Berridge, PLC

(57) ABSTRACT

An electromagnetic wave absorber is formed of an Mn—Zn ferrite including: a spinel primary phase which contains 40.0 to 49.9 mol % $Fe_2O_3$, 4.0 to 26.5 mol % ZnO, and the remainder consisting of MnO; and a secondary phase which contains CaO as a base component. In the ferrite, the spinel primary phase accounts for 50.0 to 99.0% of the aggregate mass of the spinel primary phase and the secondary phase.

1 Claim, 1 Drawing Sheet

ELECTROMAGNETIC WAVE ABSORBER FORMED OF MN-ZN FERRITE

BACKGROUND OF THE INVENTION

1. Field of the Invention

The present invention relates to an electromagnetic wave absorber which is formed of Mn—Zn ferrite and which has an excellent absorption performance in a high frequency band.

2. Description of the Related Art

An electromagnetic wave absorber to absorb electromagnetic waves may leverage either ohmic loss of a resistive element, dielectric loss of a derivative, or magnetic loss of a magnetic substance. In case of an electromagnetic wave absorber leveraging magnetic loss, its absorption characteristics can be evaluated by reflection coefficient calculated using a formula (1) below:

$$\text{Reflection Coefficient} = 20\log\left|\frac{Z_{in} - Z_o}{Z_{in} + Z_o}\right|$$

$$Z_{in} = Z_o\sqrt{\frac{\mu_r}{\varepsilon_r}}\tanh\left(j\frac{2\pi}{c}fd\sqrt{\mu_r\varepsilon_r}\right)$$

where $\mu$ is permeability, $\in$ is permittivity, c is light velocity, f is frequency of an electromagnetic wave, d is thickness of an electromagnetic wave absorber, and Z is characteristic impedance. Generally speaking, an electromagnetic wave absorber, which has a reflection coefficient of 20 dB or more at a given frequency band, is evaluated to be sufficiently absorbent in the frequency band.

An electromagnetic wave absorber leveraging magnetic loss may be formed of a ferrite material, such as an Mn—Zn ferrite or an Ni—Zn ferrite. An Mn—Zn ferrite is used mainly for an electromagnetic wave absorber intended to absorb electromagnetic waves in a relatively low frequency band ranging from 30 to 500 MHz, while an Ni—Zn ferrite is used for an electromagnetic wave absorber intended to absorb electromagnetic waves in a relatively high frequency band ranging from 500 MHz upward. Since an Ni—Zn ferrite is expensive, it is desirable to use a less expensive Mn—Zn ferrite also for a high frequency band application.

In an electromagnetic wave absorber formed of an Mn—Zn ferrite, an eddy current flows increasingly in accordance with an increase in frequency therefore causing an increase of loss. Accordingly, the resistivity of an Mn—Zn ferrite must be increased in order to duly absorb electromagnetic waves in a high frequency band. When an Mn—Zn ferrite containing more than a stoichiometric composition of 50.0 mol % $Fe_2O_3$ is sintered, $Fe^{3+}$ is reduced to produce $Fe^{2+}$ and an electron transfer occurs easily between $Fe^{3+}$ and $Fe^{2+}$, whereby the resistivity decreases to fall below 1.0 $\Omega$m. Consequently, an Mn—Zn ferrite can be used as an electromagnetic wave absorber in a frequency band only up to a few hundred kHz, from which upward an Mn—Zn has its permeability lowered significantly and loses soft magnetic characteristics thus failing to function as an electromagnetic wave absorber.

In order to increase resistivity, an Mn—Zn may contain CaO, SiO2 or the like as additive for increasing electrical resistance of its crystal grain boundary and at the same time may be sintered at a low temperature of about 1200 degrees C. for reducing its crystal grain size from about 20 $\mu$m to about 5 $\mu$m thereby increasing the ratio of crystal grain boundary. In such an Mn—Zn ferrite, however, since the crystal grain boundary itself has a low electrical resistance, it is difficult to gain a resistivity of more than 1.0 $\Omega$m. Also, if 0.20 mass % or more CaO is added, an abnormal grain growth occurs at sintering and its characteristics are deteriorated significantly.

An Mn—Zn ferrite with an increased resistivity is disclosed in, for example, Japanese Patent Application Laid-Open No. H09-180925, which contains base components of 20.0 to 30.0 mol % MnO, 18.0 to 25.0 mol % ZnO, and the remainder consisting of $Fe_2O_3$, and which has a DC resistivity of 0.3 $\Omega$m or more, and a permittivity $\epsilon$ of 100000 or less at 1 kHz. The Mn—Zn ferrite is made to achieve an increased electrical resistance by adding CaO, $SiO_2$, $SnO_2$ and/or $TiO_2$ thereto, but can thereby achieve a resistivity of only up to 2.0 $\Omega$m, which is still not good enough to absorb electromagnetic waves in a high frequency band.

Another Mn—Zn ferrite is disclosed in, for example, Japanese Patent Application Laid-Open No. H07-230909, which contains base components of 45.0 to 48.6 mol % $Fe_2O_3$, an appropriate mol % (to constitute a sum of 50.0 mol % together with $Fe_2O_3$) $Mn_2O_3$, 28.0 to 50.0 mol % MnO, and the remainder consisting of ZnO, and further contains 0.01 to 0.50 mass % $SiO_2$ and CaO as additive, and in which 1.0 mol % or less (0 excluded) $Fe^{2+}$ is present. The Mn—Zn ferrite is for use as a magnetic core material of a deflection yoke and is made to achieve an increased resistivity by limiting $Fe_2O_3$ content to less than 50.0 mol %. The Mn—Zn ferrite is intended for application to a frequency band of 64 to 100 kHz and not suitable for use in a high frequency band exceeding 1 MHz.

And, still another Mn—Zn ferrite is disclosed in, for example, Japanese Patent No. 3108803, which contains base components of 44.0 to 50.0 mol % (50.0 excluded) $Fe_2O_3$, 4.0 to 26.5 mol % ZnO, 0.1 to 8.0 mol % $TiO_2$ and/or $SnO_2$, and the remainder consisting of MnO, and which has an electrical resistance of 150 $\Omega$m or more. The Mn—Zn ferrite is made to achieve an increased resistivity by limiting $Fe_2O_3$ content to less than 50.0 mol %.

In order to well function in a high frequency band, an electromagnetic wave absorber must exhibit appropriate characteristics with regard to permeability and permittivity as well as resistivity. An electromagnetic wave absorber formed of a conventional Mn—Zn ferrite can function only in a limited frequency band, and therefore a conventional Mn—Zn ferrite sintered alone cannot make an electromagnetic wave absorber adapted to function in an extensive frequency range including a high frequency band.

SUMMARY OF THE INVENTION

The present invention has been made in light of the above problem, and it is an object of the present invention to provide an electromagnetic wave absorber which is formed of an Mn—Zn ferrite for cost reduction, satisfies the requirements, is excellent in absorption characteristics, and which is duly usable also in a high frequency band.

The present inventors have carried out research and found that a sintered Mn—Zn ferrite, which contains less than a stoichiometric composition of 50.0 mol % $Fe_2O_3$ and at the same time has very slight amounts of $Mn_2O_3$ and FeO existing therein, does not suffer deterioration in characteristics even if it contains an inconceivably high concentration of CaO, and have verified that the sintered Mn—Zn ferrite can constitute an electromagnetic wave absorber to efficiently absorb electromagnetic waves in a wide range of high frequency band when the ratio between the spinel primary phase consisting of a ferrite material and the secondary phase including a base component of CaO is appropriately arranged, and the present invention has been accomplished.

In order to achieve the object described above, an electromagnetic wave absorber according to the present invention is formed of an Mn—Zn ferrite which comprises: a spinel primary phase containing 40.0 to 49.9 mol % $Fe_2O_3$, 4.0 to 26.5 mol % ZnO, and the remainder consisting of MnO; and a secondary phase containing CaO as a base component. In the ferrite, the mass of the spinel primary phase accounts for 50.0 to 99.0% of the aggregate mass of the spinel primary phase and the secondary phase.

In the Mn—Zn ferrite for the electromagnetic wave absorber of the present invention, $Fe_2O_3$ content is 40.0 to 49.9 mol % which is less than a stoichiometric composition of 50.0 mol %. In manufacturing an electromagnetic wave absorber, an Mn—Zn ferrite is sintered in a reducing atmosphere in order to suppress the production of $Mn^{3+}$ which is responsible for deteriorating soft magnetism. However, if an Mn—Zn ferrite containing more than 50.0 mol % $Fe_2O_3$ is sintered in a reducing atmosphere, $Fe_2O_3$ in excess of 50.0 mol % is reduced to produce $Fe^{2+}$ thereby lowering resistivity of the Mn—Zn ferrite. This is the reason for $Fe_2O_3$ content to be set to less than 50.0 mol % in the present invention, thus little $Fe^{2+}$ is present in the electromagnetic wave absorber of the present invention even when the Mn—Zn ferrite is sintered in a reducing atmosphere.

Since the electromagnetic wave absorber of the present invention contains little $Mn^{3+}$ known to deteriorate soft magnetism and resistivity, and little $Fe^{2+}$ known to lower resistivity significantly as discussed above, a high resistivity and an excellent soft magnetism can be achieved at the same time. In this connection, preferred $Mn^{3+}$ content is 0.8 mol % or less in terms of $Mn_2O_3$, and preferred $Fe^{2+}$ content is 0.2 mol % or less in terms of FeO.

The electromagnetic wave absorber of the present invention contains 4.0 to 26.5 mol % ZnO. Too small ZnO content causes initial permeability to lower, while too large ZnO content causes saturation magnetization and Curie temperature to lower.

The electromagnetic wave absorber of the present invention contains, in addition to the spinel primary phase, the secondary phase comprising mainly CaO. CaO, when added to an Mn—Zn ferrite, segregates at a crystal grain boundary thereby increasing resistivty. In a conventional Mn—Zn ferrite, however, when 0.20 mass % or more CaO is added, an abnormal grain growth occurs deteriorating characteristics significantly. On the other hand, in the present invention, since the spinel primary phase contains less than 50.0 mol % $Fe_2O_3$, and trace amounts of $Mn_2O_3$ and FeO, an abnormal grain growth does not occur even when 1.00 mass % or more CaO is added.

Since CaO forms an insulating layer on a grain boundary layer of an Mn—Zn ferrite, the permeability of the electromagnetic wave absorber can be controlled by appropriately arranging the mixture ratio between the spinel primary phase having a large permeability and the non-magnetic secondary phase containing CaO. Also, the permittivity of the electromagnetic wave absorber can be controlled by appropriately arranging the mixture ratio between the spinel primary phase having a large permittivity and the secondary phase having a small permittivity. Since too large CaO content deteriorates soft magnetism, and too small CaO content results in inability to control the permeability and the permittivity, the mass ratio of the spinel primary phase to the secondary phase must be set to range from 99:1 to 50:50.

The secondary phase may contain other components than CaO, that are generally used as additive to an Mn—Zn ferrite. The components are, for example, $SiO_2$, $V_2O_5$, $MoO_3$, $ZrO_2$, $Ta_2O_5$, $HfO_2$, $Nb_2O_5$, CuO, and the like, and work to facilitate sintering action and to increase electrical resistance. Since too large content of the components causes an abnormal grain growth, their preferred contents are 1.00 mass % or less $SiO_2$, 0.20 mass % or less $V_2O_5$, 0.20 mass % or less $MoO_3$, 0.20 mass % or less $ZrO_2$, 0.20 mass % or less $Ta_2O_5$, 0.20 mass % or less $HfO_2$, $Nb_2O_5$, and 12.0 mass % or less CuO.

The electromagnetic wave absorber of the present invention is manufactured as follows. Material powders of $Fe_2O_3$, ZnO and MnO as components for the spinel primary phase are weighed for a predetermined compound ratio, mixed, calicined at a temperature appropriately determined between 800 and 1000 degrees C. depending on the composition of the spinel primary phase, and milled by, for example, a general-purpose ball mill. CaO and other additives as required are added to the processed powders and mixed, and a compound powder of a target composition is given. Then, the compound powder is, according to a usual manufacturing process, granulated with addition of a binder, such as polyvinyl alcohol, polyacrylamide, methylcellulose, polyethylene oxide, or glycerin, and pressed, for example, under a pressure of 80 MPa or more into green compacts having a predetermined shape. The green compacts are sintered at a temperature of 1000 to 1300 degrees C. in an atmosphere with oxygen partial pressure controlled after charging inert gas, such as nitrogen gas, into a furnace, and cooled down in the same atmosphere. The green compacts may alternatively be sintered in the air.

DETAILED DESCRIPTION OF THE PREFERRED EMBODIMENTS

Figure 1:
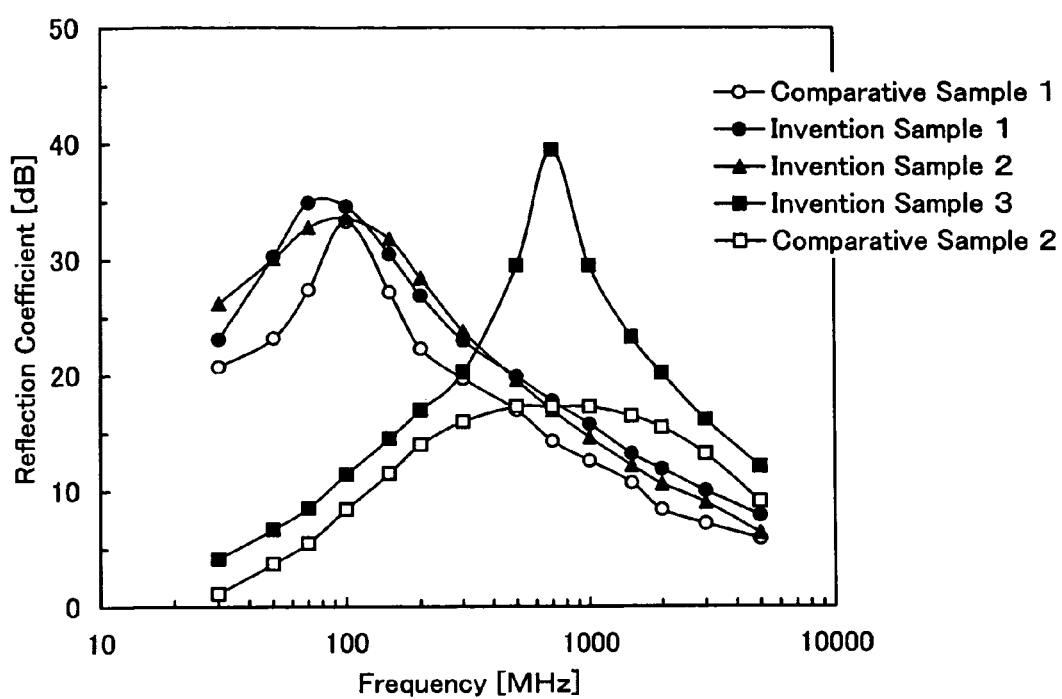
FIG. 1 is a graph of absorption characteristics of electromagnetic wave absorbers of invention samples and comparative samples, showing reflection coefficient as a function of frequency.

The present invention will be explained with respect to specific examples thereof, but it is to be understood that the present invention is by no means limited thereto.

EXAMPLES 5 different kinds of test samples including 2 comparative samples were produced using components as shown in Table 1. Material powders of $Fe_2O_3$, ZnO and MnO were mixed, agitated by an attritor, calcined in the air at 850 degrees C. for 2 hours, and milled by an attritor for 1 hour, and a compound powder was gained. Then, CaO in an amount shown in Table 1 was added to the processed powder in Table 1, and the powder thus prepared was agitated by an attritor for 1 hour, granulated with addition of polyvinyl alcohol, and pressed under a pressure of 80 MPa into toroidal cores (green compacts). The green compacts were sintered at 1200 degrees C. for 2 hours in a furnace where an atmosphere was controlled by charging nitrogen, and then were cooled down in the same atmosphere, and invention samples 1 to 3 and comparative samples 1 and 2 each having an outer diameter of 7.0 mm, an inner diameter of 3.0 mm and a height of 10.0 mm were obtained.

$Mn_2O_3$ and FeO content amounts in the samples were determined titrimetrically (=using a titration method) on all the samples, and are shown in Table 1. And, permeability and permittivity were measured at various frequencies by a coaxial tube S-parameter measurement technique to calculate a reflection coefficient thereby evaluating electromagnetic wave absorption characteristics, and the results of the calculation are shown in FIG. 1.

TABLE 1

| Sample No. | Spinel Primary Phase [mol %] | | | Secondary Phase [mass %][3] | Titration Analysis [mol %] | |
|---|---|---|---|---|---|---|
| | $Fe_2O_3$[1] | $MnO$[2] | ZnO | CaO | $Mn_2O_3$ | FeO |
| Comparative 1 | 47.0 | 40.0 | 13.0 | 0.0 | 0.1 | 0.1 |
| Invention 1 | 47.0 | 40.0 | 13.0 | 1.0 | 0.1 | 0.1 |
| Invention 2 | 47.0 | 40.0 | 13.0 | 25.0 | 0.1 | 0.1 |
| Invention 3 | 47.0 | 40.0 | 13.0 | 50.0 | 0.1 | 0.1 |
| Comparative 2 | 47.0 | 40.0 | 13.0 | 60.0 | 0.1 | 0.1 |

Notes:
[1] $Fe_2O_3$ refers to FeO as well as $Fe_2O_3$.
[2] MnO refers to $Mn_2O_3$ as well as MnO.
[3] Ratio to the aggregate mass of the spinel primary phase and the secondary phase As seen from FIG. 1, invention samples 1 and 2 both have a reflection coefficient of 20 dB or more in a frequency band of 30 to 500 MHz and duly function as an electromagnetic wave absorber in a low frequency band. Invention sample 3 has a reflection coefficient of 20 dB or more in a frequency band of more than 500 MHz, thus proving that the sintered ferrite alone makes an electromagnetic wave absorber adapted to duly function in a high frequency band (500 to 1000 MHz). On the other hand, comparative sample 1 has a reflection coefficient curve which has a sharp peak thus functioning as an electromagnetic wave absorber only in a limited frequency band, and comparative sample 2 has a too small mass ratio of the spinel primary phase which is a magnetic member, and therefore cannot gain excellent radio wave absorption characteristics throughout an overall frequency band.

What is claimed is:

1. An electromagnetic wave absorber formed of an Mn—Zn ferrite comprising:
    a spinel primary phase which contains 40.0 to 49.9 mol % FeO and $Fe_2O_3$, 4.0 to 26.5 mol % ZnO, and a remainder of MnO and $Mn_2O_3$, wherein $Mn_2O_3$ is present in an amount of 0.8 mol % or less and FeO is present in an amount of 0.2 mol % or less; and
    a secondary phase which contains CaO as a base component,
    wherein a mass of the spinel primary phase accounts for 50.0 to 99.0% of an aggregate mass of the spinel primary phase and the secondary phase.

* * * * *